United States Patent [19]
Heimann et al.

[11] 3,933,549
[45] Jan. 20, 1976

[54] LAMINATED FLOOR MANUFACTURING METHOD

[75] Inventors: Fred G. Heimann, Mt. Clemens; Richard Abbott, Dearborn, both of Mich.

[73] Assignee: Fruehauf Corporation, Detroit, Mich.

[22] Filed: Mar. 15, 1974

[21] Appl. No.: 451,440

[52] U.S. Cl. .................. 156/79; 156/166; 156/216; 156/210; 156/250; 156/324; 264/46.5; 264/261; 428/71; 428/117; 428/189; 428/310
[51] Int. Cl.² .............................................. B32B 5/18
[58] Field of Search ............ 156/210, 79, 250, 166, 156/324, 216; 264/45, 46.5, 261; 161/161, 459, 462, 470–473, 490–496; 428/71, 117, 310, 184

[56] References Cited
UNITED STATES PATENTS

| | | | |
|---|---|---|---|
| 1,592,824 | 7/1926 | Fairchild | 156/210 |
| 3,090,078 | 5/1963 | Ackles | 264/46.5 |
| 3,242,240 | 3/1966 | Tantlinger | 264/46.5 |
| 3,666,590 | 5/1972 | Susuki et al. | 156/210 |
| 3,791,912 | 2/1974 | Allard | 161/161 |
| 3,792,141 | 2/1974 | Offutt | 156/79 |

*Primary Examiner*—Edward G. Whitby
*Attorney, Agent, or Firm*—Harness, Dickey & Pierce

[57] ABSTRACT

A method of manufacturing foam filled laminated planks which includes continuous means for forming and feeding a longitudinally corrugated plastic reinforcing core between, and bonding it to, top and bottom cover sheet laminae consisting of roll-fed strips of resin-impregnated fabric. The corrugations of the core define channels extending lengthwise through the assembly consisting of the core and cover sheets, and lengths are cut off and fed laterally therefrom to a position wherein each channel is aligned with an elongated lance, and then fed longitudinally into overfitted relation on the lances. The outer ends of the channels are closed, and foaming plastic is fed into the channels through the lances. The planks are then moved off of the lances toward a desired delivery position.

3 Claims, 5 Drawing Figures

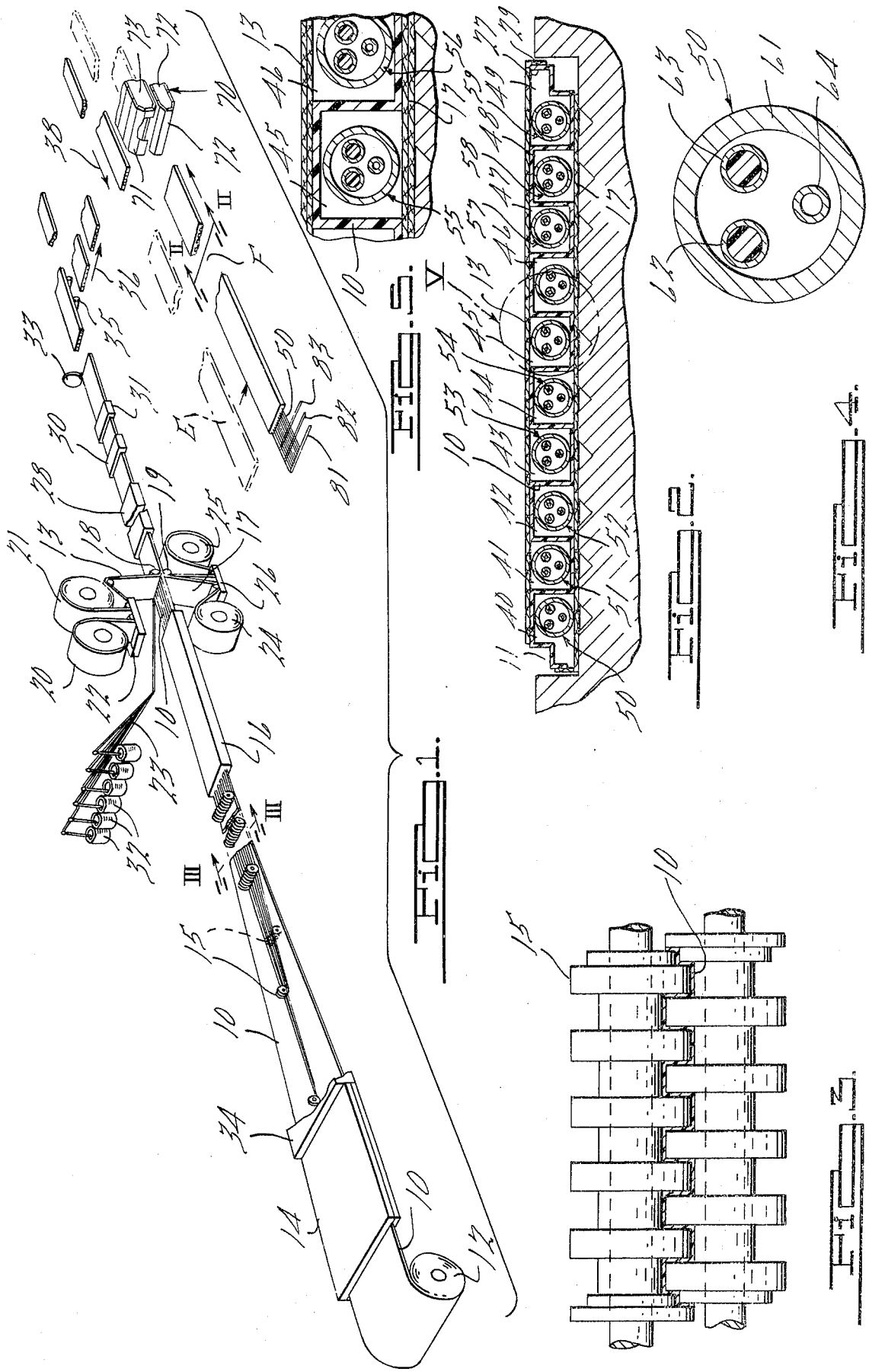

LAMINATED FLOOR MANUFACTURING METHOD

BACKGROUND OF THE INVENTION

Reinforced laminated structures have been produced heretofore from continuous strips of ribbed or corrugated core material bonded to outer laminae, with cellular reinforcing in the channels defined by the corrugations. The overall objective of the present invention is to improve upon methods of manufacturing materials of this class, particularly by improving the method of inserting the foaming material in the channels whereby such material is accurately and uniformly fed into each channel and the material is prevented from getting between the core and cover sheets.

Other objects and advantages will be apparent upon consideration of the present disclosure in its entirety.

BRIEF DESCRIPTION OF THE FIGURES OF DRAWING

FIG. 1 is a diagrammatic perspective view of apparatus for producing planks in accordance with the improved method, planking material in course of production being illustrated, and portions being broken away:

FIGS. 2 and 3 are cross-sections on a larger scale taken as indicated by the lines and arrows II—II and III—III, respectively, of FIG. 1 and looking in the direction of the arrows;

FIG. 4 is an enlarged cross-sectional view of one of the foaming lances; and

FIG. 5 is an enlarged view of the portion of FIG. 2 encircled and designated V.

DETAILED DESCRIPTION OF THE PREFERRED FORM OF THE INVENTION

A plastic strip core material 10, which may be of the thermosetting type, is fed from a roll 12 through a preheating chamber 14 and then through a series of corrugating rolls 15 which form longitudinal corrugations in the core strip. Heating may be maintained during the corrugating operation by an oven enclosure 34 forming a continuation of the preheating chamber. The spaces 40–49 between the alternately reversed walls of the corrugations define continuous channels within the assembled structure, as will more fully appear. The rolls may also form the core material to lap-joint contour along the edges, as indicated at 11, where lap-joint planking is desired, and form edge flanges as 27 adapted to overlap and to be bonded to the cover sheets 13, 17 which will be described more fully hereinafter.

The core strip is continuously fed forwardly from the supply roll 12 through the forming rolls and then through a curing unit 16 from which the corrugated sheet emerges in a more rigid condition.

The core strip continues forwardly between rollers 18, 19 and between top and bottom fabric cover laminae generally designated 13 and 17, respectively. The cover laminae consist of roll-fed strips which are led around the rollers 18 and 19 above and below the now-corrugated core member 10. Each of the cover laminae 13, 17, is formed of a double layer of fabric. The strips of the top layer are taken from fabric supply rolls 20, 21, and are passed through an impregnating resin bath tank 22, and are then fed under the roll 18 and onto the top of the longitudinally corrugated core member. The bottom layer is similarly formed from two fabric strips supplied from rolls 24, 25, the material from these rolls being similarly led through a resin bath tank 26 and then passed over the roll 19 which presses it against the bottom of the core. The laminae of the top and bottom strips are bonded together and to the core by the resin applied thereto in the tanks 22, 26.

Reinforcing cords 23 may be fed into the core member from supply spools 32. Although only one bank of spools is shown, feeding cord to the core near one edge, preferably both edges are similarly reinforced.

The cover strips and core member then travel through a sizing-curing unit 28 in which the resin is hardened to bond all of these elements together and stiffen the assembly. The sizing-curing unit also folds the edges of the fabric over the edge flanges 27 of the core member as indicated at 29 to provide a strong bond in these areas.

Alternately reciprocating pull members 30, 31 engage the assembled core and cover strips beyond the sizing-curing unit 28 and supply the power for continuously moving the laminated assembly toward the right, as viewed in FIG. 1.

A flying cutoff saw generally designated 33 is provided to sever the assembled material into individual planks which are delivered to a runout table 35.

From the runout table 35 the planks are conveyed laterally, in the direction of the arrow 36, during which lateral movement additional curing takes place. They are then fed longitudinally in a reverse direction, indicated by the arrow 38, to a lance-engaging position in which the channels 40–49 are individually overfitted upon a like number of filling lances 50–59, such overfitting being effected by the rearward movement of the plank. The position of a plank at the lance-engaging station is indicated by the letter "E" in FIG. 1. The lances are somewhat longer than the plank, and in position E extend virtually the full length of the interior of the plank, to a position adjacent the rear or right end, as viewed in FIG. 1.

Each lance comprises a metal tube 61 adapted to support at its outer end a suitable nozzle assembly (not shown) and having therein a pair of supply tubes 62 and 63, each of which is adapted to be connected to a source of one of the constituents of a plastic which foams when the two constituents contact each other at the discharge end of the nozzle. A third conduit 64 which similarly extends through the lance is adapted to feed a solvent to and through the nozzle to clean the same at the conclusion of foaming. Alternatively the conduit 64 may be omitted and the solvent fed through the lance tube 61 itself. The lances are supplied through suitable manifolds 81, 82, 83 and flexible hoses (not shown) connected to the respective tubes of all of the lances for the plastic constituents and solvent.

The farther or right end of the plank is then closed by means of a suitable plug which may be left in place to impart a finished appearance to the end of the plank, or removed after foaming as desired. After the plank is fully overfitted upon the lances, the lances together with the overfitted plank are shifted laterally to a foaming station, F, at which the plank is aligned with a desired delivery facility. The delivery facility includes a combined conveyor-curing unit generally designated 70 for moving the plank to the desired discharge position.

When the plank is aligned with the conveyor-curing unit 70, the foamable constituents are injected into the channels 40–49 through the lances. Foaming occurs at the tips of the lances, which permits the use of a fast-setting compound. U.S. Pat. No. 3,881,657, granted May 6, 1975, discloses a nozzle construction adapted for use in feeding the foamable materials into the channels. As foaming progresses the plank is moved toward the right and fed into the space between the upper and lower belt assembly portions 71, 72, respectively, of the conveyor-curing unit 70. Such belt assemblies are of the articulated tank-tread type, formed of a material which is a good heat conductor, and the box-like guides 73, 74, respectively, for the belts 71, 72, contain heating means such as electrical resistances or gas burners for heating the plank to assist in curing the foam while the belts are moving the plank to its delivery position (not shown). The trailing end of the plank may be similarly plugged if desired prior to hardening of the foam at such end.

This Detailed Description of Preferred Form of the Invention, and the accompanying drawings, have been furnished in compliance with the statutory requirement to set forth the best mode contemplated by the inventors of carrying out the invention. The prior portions consisting of the "Abstract of the Disclosure" and the "Background of the Invention" are furnished without prejudice to comply with administrative requirements of the Patent Office.

What is claimed is:

1. The method of manufacturing a laminated panel or the like which includes synchronously moving forwardly and securing together a pair of spaced parallel sheets of paneling material and an interposed core sheet having a transversely crenelated cross section which defines longitudinal channels, said forward movement being parallel to the longitudinal channels, severing the same transversely to form individual panels, closing the forward ends of the channels, moving each panel laterally to a position wherein each channel is in alignment with a foam-filling lance and then in a reverse longitudinal direction onto overfitting relation with respect to the lances, moving the panel and lances together laterally farther in the same lateral direction to a position of alignment with a delivery station, and then injecting a foaming agent through the lances into the hollow core while the panel is moving longitudinally in the forward direction off of the lances to a delivery position.

2. A method according to claim 1 wherein the sheets and core are formed and bonded during the first-mentioned forward movement and are cured during the first-mentioned lateral movement.

3. A method as defined in claim 1 wherein the foaming agent consists of at least two constituents which foam when brought into contact with each other and which are conducted through the lances in separate channels to the tip regions of the lances.

* * * * *